(12) United States Patent
Kim

(10) Patent No.: US 11,975,733 B2
(45) Date of Patent: May 7, 2024

(54) SYSTEM AND METHOD FOR NOTIFYING OF ABNORMALITY SIGNAL AROUND VEHICLE

(71) Applicant: Young Eon Kim, Cupertino, CA (US)

(72) Inventor: Young Eon Kim, Cupertino, CA (US)

(73) Assignee: Young Eon Kim, Cupertino, CA (US)

( * ) Notice: Subject to any disclaimer, the term of this patent is extended or adjusted under 35 U.S.C. 154(b) by 56 days.

(21) Appl. No.: 17/794,821

(22) PCT Filed: Jun. 10, 2020

(86) PCT No.: PCT/KR2020/007504
§ 371 (c)(1),
(2) Date: Jul. 22, 2022

(87) PCT Pub. No.: WO2021/153856
PCT Pub. Date: Aug. 5, 2021

(65) Prior Publication Data
US 2023/0074274 A1 Mar. 9, 2023

(30) Foreign Application Priority Data
Jan. 29, 2020 (KR) .................... 10-2020-0010418

(51) Int. Cl.
*B60W 50/14* (2020.01)
*B60W 40/02* (2006.01)
(Continued)

(52) U.S. Cl.
CPC ............ *B60W 50/14* (2013.01); *B60W 40/02* (2013.01); *B60W 60/001* (2020.02);
(Continued)

(58) Field of Classification Search
CPC .... B60W 50/14; B60W 60/001; B60W 40/02; B60W 2050/0052; B60W 2050/143; B60W 2050/146; B60W 2420/54
See application file for complete search history.

(56) References Cited

U.S. PATENT DOCUMENTS 8,111,583 B2* 2/2012 Schwartz ............... H04R 3/005
367/127
9,697,850 B2* 7/2017 Hearing ................... G01H 1/00
(Continued)

FOREIGN PATENT DOCUMENTS

KR 10-1519255 B1 5/2015
KR 10-2019-0046057 A 5/2019

*Primary Examiner* — Chico A Foxx
(74) *Attorney, Agent, or Firm* — Stein IP, LLC

(57) ABSTRACT

Disclosed are a system and a method for notifying an abnormality signal around a vehicle. The system includes: an external sound recognition module mounted on the outside of a vehicle or between the inside and outside of a vehicle, and configured to recognize a sound generated within a radius of a predetermined value or less from a point where the vehicle is located; a noise filtering module configured to filter out noise classified as a noise item; an abnormality signal detection module configured to identify the detailed sound information including the source, magnitude, and type of the detected sound, and to detect an auditory abnormality signal; and a notification module configured to notify each of the type, magnitude, and generation location of the auditory abnormality signal by means of any one or more of a visual signal and an auditory signal.

10 Claims, 3 Drawing Sheets

(51) Int. Cl.
*B60W 60/00* (2020.01)
*B60W 50/00* (2006.01)

(52) U.S. Cl.
CPC .............. *B60W 2050/0052* (2013.01); *B60W 2050/143* (2013.01); *B60W 2050/146* (2013.01); *B60W 2420/54* (2013.01)

(56) References Cited

U.S. PATENT DOCUMENTS

| | | | |
|---|---|---|---|
| 10,896,222 B1* | 1/2021 | Christodoulopoulos | ..................... G06F 40/30 |
| 2010/0206078 A1* | 8/2010 | Cheon | ..................... G01V 1/01 73/587 |
| 2011/0200199 A1* | 8/2011 | Wakao | ................... G01H 17/00 381/56 |
| 2015/0158482 A1* | 6/2015 | Kaminade | ............... G08G 1/166 701/1 |
| 2016/0061904 A1* | 3/2016 | Flügge | .............. H04W 52/0261 702/63 |
| 2017/0021768 A1* | 1/2017 | Jaegal | .................... H04R 1/326 |
| 2017/0305427 A1* | 10/2017 | Kim | .................... B60Q 1/2603 |
| 2018/0114445 A1* | 4/2018 | Jang | ........................ G01S 3/801 |
| 2018/0208113 A1* | 7/2018 | Haupts | ................. B60W 10/18 |
| 2018/0211528 A1* | 7/2018 | Seifert | .................. G06V 20/58 |
| 2020/0064856 A1* | 2/2020 | Silver | ................. B60R 11/0247 |
| 2020/0191613 A1* | 6/2020 | Englund | ............ G08B 13/1672 |
| 2020/0217917 A1* | 7/2020 | Ryu | ........................ G01S 3/801 |
| 2020/0348687 A1* | 11/2020 | Paudel | ..................... G01S 5/30 |

\* cited by examiner

SYSTEM AND METHOD FOR NOTIFYING OF ABNORMALITY SIGNAL AROUND VEHICLE

CROSS-REFERENCE TO RELATED APPLICATIONS

This application is a national stage of International Application No. PCT/KR2020/007504, filed Jun. 10, 2020, which claims the benefit of Korean Application No. 10-2020-0010418, filed Jan. 29, 2020, in the Korean Intellectual Property Office, the disclosures of which are incorporated herein by reference.

TECHNICAL FIELD

The present disclosure relates to a system and method for notifying an abnormality signal around a vehicle, and more specifically to a system and method for filtering out normal noise generated around a vehicle in which a soundproofing system for blocking external noise is installed and transmitting an auditory abnormality signal around the vehicle to the vehicle or an occupant.

BACKGROUND

Unless otherwise indicated herein, the items described in this section are prior art regarding the claims of the present application, and the inclusion of an item in this section is not an admission that it is prior art.

Soundproof packing is a packing-type soundproofing material installed in a vehicle that reduces wind noise and external noise generated during the driving of the vehicle. Soundproof packing is installed in the gaps of the doors of a vehicle and helps to prevent the inflow of external noise and maintain internal temperature. Soundproof packing is generally made of synthetic rubber and is thus flexible, so that it is easy to install the soundproof packing in the gaps of doors. Furthermore, in order to prevent noise such as engine noise, the driving noise of surrounding vehicles, wind noise, etc. from entering the inside of a vehicle and interfering with driving during the driving of the vehicle, noise entering from the outside can be reduced by attaching soundproof packing to gaps or the inside of an interior material.

There is a tendency that the types of soundproofing materials that block noise generated outside a vehicle are becoming more diverse and the effectiveness thereof is also increasing. Accordingly, when the windows and doors of recently released vehicles are completely closed, the occupants of the vehicles may rarely recognize noise inside the vehicles even when they are in noisy space.

Such vehicle soundproofing materials have the advantage of providing a quiet and pleasant environment to an occupant when a vehicle is driven and stopped. However, when loud noise, indicative of an abnormality context such as a collision, is generated outside a vehicle, noise notifying an occupant of the abnormality context is also blocked, so that there is a possibility of jeopardizing the safety of the vehicle occupant.

DISCLOSURE

Technical Problem

An embodiment provides a system that blocks external normal noise generated around a vehicle, notifies an abnormality signal in the form of a sound to the vehicle or an occupant, identifies detailed sound information, and visually notifies an auditory abnormality signal (an external sound signal) corresponding to a risky context generated around the vehicle.

In addition, the source, magnitude, and sound type of a recognized auditory abnormality signal outside a vehicle are converted into visual or audio signals (objects) such as those of a previously stored database, and are notified to an occupant inside the vehicle, so that 5 a visual or auditory notification system is provided and the occupant is prevented from being disturbed by a plosive sound or sharp noise that stimulates the occupant.

Technical Solution

A system for notifying an abnormality signal around a vehicle according to an embodiment includes: an external sound recognition module mounted on the outside of a vehicle or between the inside and outside of a vehicle, and configured to recognize a sound generated within a radius of a predetermined value or less from a point where the vehicle is located; a noise filtering module configured to filter out noise classified as a noise item based on identified detailed sound information; an abnormality signal detection module configured to identify the detailed sound information including the source, magnitude, and type of the detected sound, and to detect an auditory abnormality signal that is an abnormality sound of predetermined decibels or more including a collision sound, a siren, a drone sound, and a loud voice; and a notification module configured to notify each of the type, magnitude, and generation location of the auditory abnormality signal by means of any one or more of a visual signal and an auditory signal.

A method for notifying an abnormality signal around a vehicle according to another embodiment includes: (A) recognizing, by an external sound recognition module, a sound generated within a radius of a predetermined value or less from a point where the vehicle is located; (B) filtering out, by a noise filtering module, noise classified as a noise item based on identified detailed sound information; (C) identifying, by an abnormality signal detection module, the detailed sound information including the source, magnitude, and type of the detected sound, and detecting, by the abnormality signal detection module, an auditory abnormality signal that is an abnormality sound of predetermined decibels or more including a collision sound, a siren, a drone sound, and a loud voice; and (D) notifying, by a notification module, each of the type, magnitude, and generation location of the auditory abnormality signal by means of any one or more of a visual signal and an auditory signal.

Advantageous Effects

The abnormality signal notification system described above filters out normal noise outside a vehicle and transmits an auditory abnormality signal to the vehicle or an occupant, so that the occupant can become aware of all abnormality signals while using the vehicle in a quiet and comfortable environment, thereby improving the safety and convenience of vehicle use of the occupant Furthermore, the abnormality signal notification system is applied to an autonomous vehicle, thereby improving autonomous driving capabilities.

In addition, the sounds of rather unpleasant auditory abnormality signals such as a plosive sound, a considerably loud sound, a scratch sound, etc. are converted into auditory and visual objects in other forms, and notification thereof is provided to a vehicle occupant, so that auditory abnormality signals generated outside a vehicle can be identified in the state in which the occupant does not directly listen to noise.

It should be understood that the effects of the present invention are not limited to the above-described effects and include all effects that can be inferred from the configuration of the invention described in the detailed description of the present invention or the claims.

BEST MODE

A system for notifying an abnormality signal around a vehicle according to an embodiment includes: an external sound recognition module mounted on the outside of a vehicle or between the inside and outside of a vehicle, and configured to recognize a sound generated within a radius of a predetermined value or less from a point where the vehicle is located; a noise filtering module configured to filter out noise classified as a noise item based on identified detailed sound information; an abnormality signal detection module configured to identify the detailed sound information including the source, magnitude, and type of the detected sound, and to detect an auditory abnormality signal that is an abnormality sound of predetermined decibels or more including a collision sound, a siren, a drone sound, and a loud voice; and a notification module configured to notify each of the type, magnitude, and generation location of the auditory abnormality signal by means of any one or more of a visual signal and an auditory signal.

Mode for Invention

Advantages and features of the present invention, and methods for achieving them will become apparent with reference to embodiments that will be described below in detail in conjunction with the accompanying drawings. However, the present invention is not limited to the embodiments to be disclosed below, but may be implemented in various different forms. The present embodiments are provided merely to make the disclosure of the present invention complete and to fully convey the scope of the invention to those of ordinary skill in the art to which the present invention pertains. The present invention is defined only based on the scope of the claims. Throughout the present specification, like reference symbols refer to like components.

In the following description of the embodiments of the present invention, when it is determined that a detailed description of a well-known function or configuration may unnecessarily obscure the gist of the present invention, the detailed description will be omitted. In addition, the terms to be described later are terms defined by taking into consideration functions in the embodiments of the present invention, which may vary depending on the intention of a user or operator or custom. Accordingly, the definition should be made based on the content throughout the present specification.

Figure 1:
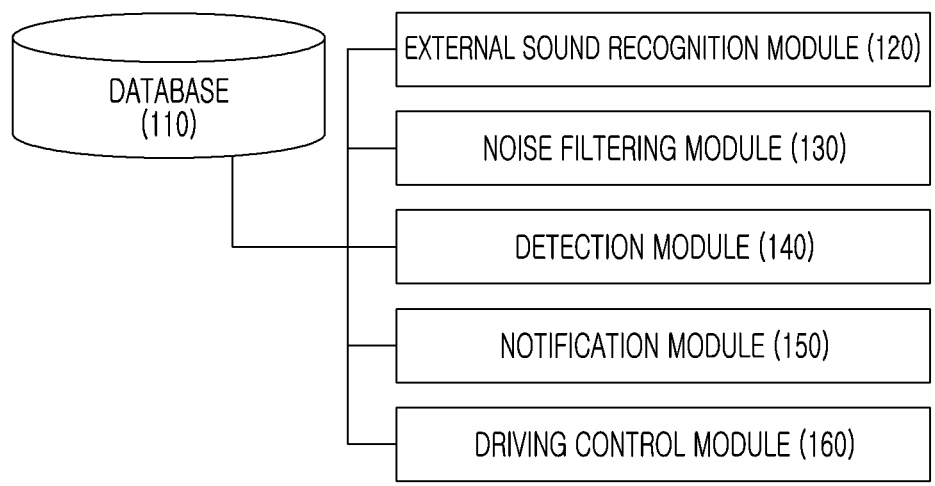
FIG. 1 is a diagram showing the data processing configuration of an auditory abnormality signal notification system according to an embodiment.

FIG. 1 is a diagram showing the data processing configuration of an auditory abnormality signal notification system according to an embodiment.

Referring to FIG. 1, the auditory abnormality signal notification system according to the embodiment may be configured to include a database 110, an external sound recognition module 120, a noise filtering module 130, a detection module 140, a notification module 150, and a driving control module 160. The term 'module' used herein should be construed to include software, hardware, or a combination thereof depending on the context in which the term is used. For example, the software may be machine language, firmware, embedded code, or application software. As another example, the hardware may be a circuit, a processor, a computer, an integrated circuit, an integrated circuit core, a sensor, a Micro-Electro-Mechanical System (MEMS), a passive device, or a combination thereof.

The database 110 stores detailed sound information, and context information matching the detailed sound information. Furthermore, the database 110 temporarily stores data on a sound group for learning for recognizing the types of sounds until learning is finished, and stores weight values based on learning. The context information is values that are set by quantifying and objectifying significances, risks, and/or the like based on the types and magnitudes of sounds set according to the learned weight values. In an embodiment, context information matched to detailed sound information such as each frequency, each magnitude (each decibel), and each sound type is stored in the database. The context information may include emergency context information that needs to be transmitted to a user in a vehicle, such as a vehicle collision, an explosion, a siren, a drone, etc. Furthermore, abnormality signal (sound) levels based on detailed sound information are stored in advance. For example, when an abnormality signal level is high, the frequency and magnitude of a sound may exceed a predetermined level, or the sound may be a sound matched to the context of a high abnormality group such as a collision, a drone sound, a siren, a motorcycle sound, etc.

In addition, a matching table in which sounds representing the meanings of external sounds are stored to be matched to auditory abnormality signals generated outside vehicles is generated and stored in the database 110, as shown in Table 1 as an example.

TABLE 1

| Unique Number | Details of External Sound | Sound to be output as an Auditory Object | Others |
|---|---|---|---|
| 001 | external sound caused by the collision of a vehicle | "collision" | repetition by settings |
| 002 | sound caused by a drone | "drone" | repetition by settings |
| 003 | sound caused by a motorcycle | "motorcycle" | repetition by settings |
| . . . | . . . | . . . | . . . |

Furthermore, a table in which visual objects, such as icons, representing the meanings of external sounds are stored to be matched to auditory abnormality signals generated outside vehicles in order to provide visual notification is generated and stored in the database, as shown in Table 2 below:

TABLE 2

| Unique Number | Details of External Sound | Visual Shape to be displayed | Example |
|---|---|---|---|
| 001 | external sound caused by the collision of a vehicle | icon meaning or representing a "collision" | collision icon |
| 002 | sound caused by a drone | icon meaning or representing a "drone" | drone image or icon |
| 003 | sound caused by a motorcycle | icon meaning or representing a "motorcycle" | motorcycle image or icon |
| ... | ... | ... | ... |

Furthermore, in the database 110, external sounds necessary to detect the types of external signals are selected and also the characteristics of the individual external signals are stored, so that the detection module 140 can search for the most similar signal and detect and specify the type of external signal. For example, a collision sound, a drone sound, a siren sound, a motorcycle sound, etc. may be set and stored as the external sounds.

The external sound recognition module 120 recognizes a sound that is generated within a radius of a predetermined value or less from a point where a vehicle is located and exceeds an abnormality level. Furthermore, one or more acoustic sensors such as one or more microphones are mounted outside a vehicle or between the inside and outside of a vehicle, and detect and recognize abnormality noise (an abnormality sound) even in adverse conditions. In an embodiment, the abnormality level is an index obtained by quantifying the degree of abnormality of a context indicated by a recognized sound. The closer the source of a sound is and the louder the sound is, the higher the abnormality level is. An abnormality level may be determined according to the type of previously stored context information matched to a recognized sound.

The signal output recognized by the external sound recognition module 120 is output via a number of channels equal to the number of acoustic sensors used for external sound recognition. When four acoustic sensors are used, sound signals recognized via four channels are output.

The noise filtering module 130 filters out the normal noise classified as a noise item based on the detailed sound information recognized by the external sound recognition module 120. For example, the noise filtering module 130 filters out normal types of noise generated in daily driving contexts, such as people's conversation sounds, a tire friction sound, and a general automobile engine sound. Furthermore, all sounds whose magnitude is equal to or lower than a predetermined level or whose abnormality is lower than a predetermined level are considered as noise and filtered out, so that a user can be provided with a quiet environment in a vehicle.

The filtering of the noise filtering module 130 may employ an electrical method or a mechanical method. For example, the electrical method detects only a necessary sound by using a low pass filter, a high pass filter, or a band pass filter. The mechanical method detects only a necessary sound by providing the external recognition module with a mechanical filter to block mechanically unnecessary normal noise such as a wind sound. In other words, the mechanical method filters out normal noise such as tire friction or wind noise and detects only a sound necessary for the recognition of an external sound. The outputs of the noise filtering module 130 are output for respective channels in accordance with acoustic sensors used, and the signal outputs S for the respective channels are denoted by $S_1$, $S_2$, $S_3$, $S_4$, . . . .

The detection module 140 detects an auditory abnormality signal, including noise of predetermined decibels or higher, such as a collision sound, a siren, a drone sound, a loud voice, or the like, generated outside a vehicle by identifying detailed sound information including the source, magnitude, and type of a sound detected through the noise filtering module 130. For example, after identifying the detailed sound information of the sound recognized outside the vehicle, the detection module 140 detects the recognized external signal as an abnormality signal when the magnitude of the sound exceeds a predetermined value, when the frequency of the detailed sound information is indicative of an abnormality frequency, or when the recognized information of the sound matches one of the previously stored abnormality contexts at a predetermined percentage or higher and the sound source of the sound is within a set distance from the current location of the vehicle.

The detection module 140 recognizes the source, magnitude, and type of the external sound for the external sound abnormality signal by using the outputs for the respective channels and a sum signal, and outputs them to the notification module. The magnitude of the external sound signal is recognized as the level of the sum signal for the channels. In other words, the sum external signal output $S_{all}$ obtained through summation to allow the overall magnitude of the external sound signal to be recognized is represented by:

$$S_{all} = S_1 + S_2 + S_3 + S_4 + \ldots$$

As for the source of the external sound, for example, when four external acoustic sensors are installed, respective detected output signals are front, rear, left, and right signals, i.e., four outputs, including a front-left signal $S_{fl}$, a front-right signal $S_{fr}$, a back-left signal $S_{bl}$, and a back-right signal $S_{br}$, that appear as follows. For example, if $(S_{fl}+S_{fr})>(S_{bl}+S_{br})$, the source of the sound is recognized as being located in front of the vehicle. If $(S_{fl}+S_{fr})<(S_{bl}+S_{br})$, the source of the sound is recognized as being located behind the vehicle. Furthermore, the distance may be recognized by measuring the Time Differences Of Arrival (TDOAs) between the four channel signals, and the error in distance may be corrected.

For example, as for the detection of the type of external signal, the detection module 140 performs calculation using the sum external signal output $S_{all}$ and the weight values stored in the database, searches for the most similar external signal among the external signals stored in the database, detects the type of signal, and specifies the detected signal.

The notification module 150 converts each of the type, magnitude, and source of the auditory abnormality signal into any one or more of a visual signal and an auditory signal, and displays them on an output panel such as the monitor of the vehicle. Furthermore, the notification module 150 calculates the source of the abnormality signal through detailed abnormality signal information including the TDOA, decibel, and propagation direction information of the detected abnormality signal. Moreover, the notification module 150 converts noise of predetermined decibels or higher or a sound included in a high-frequency region and causing discomfort to a listener, such as a plosive sound, or a scratch sound, into another abnormality notification signal, and outputs it. In other words, the notification module 150 may output the noise or signal after visually converting it into an icon, or after changing it in the magnitude and frequency thereof or converting it into an auditory object.

Furthermore, as for the magnitude of a sound that is output in proportion to a detected sound signal as will be described below, the notification module 150 may output a small sound almost without any change, and may output a loud sound after reducing it by means of a method such as a log scale method so that an occupant can listen to it without being shocked. For example, the compression of a sound may be performed by reducing the sound using a log scale method or the like as in Equation 1, and a resulting signal may be output through a speaker inside a vehicle. In other words, a compressed signal $S_{com}$ that is compressed and output may be represented through compression via Equation 1. In this case, S is a signal $S_{all}$ ranging from 0 to a freely set level. If $S_{all}$ is higher than $S_b$, the log thereof is taken and added to form $S_{com}$. If $S_{all}$ is lower than $S_b$, $S_{all}$ is composed of $S_{com}$.

$$S_{com} = S_b + 20 \log(S_{all} - S_b): \text{ if } S_{all} > S_b, S_{com} = S_{all}: \text{ if } S_{all} <= S_b \quad \text{Equation 1}$$

In the case of visualization in the notification module 150, as for the source, magnitude, and type of an external sound signal detected by the detection module 140, a distance away from a current location may be designated for the source of the external sound on a display used in an existing navigator, conversion into an output distance may be performed according to the designated distance, and the magnitude of the external sound may be represented by adjusting the size, color, and flickering cycle and intensity of an icon, as in the table stored in the database 110. Furthermore, the type of external sound may be represented by displaying a matched icon from the database in which auditory icons are stored for set sounds. In the case of auditory representation, the direction of the source of the external sound may be represented by a multi-speaker installed in a vehicle, and the distance may be represented by the magnitude of a sound. The magnitude of the external sound may be represented by the magnitude of a sound and the number of repetitions of the sound. The type of external sound may be represented by a name stored in the matching table (a sound icon: "collision" or the like) or a compressed sound.

The driving control module 160 may be set to automatically start autonomous driving when an abnormality signal generation region is away from a vehicle by a predetermined distance or less and the level of an abnormality context matched to an abnormality signal is equal to or higher than a predetermined level.

Figure 2:
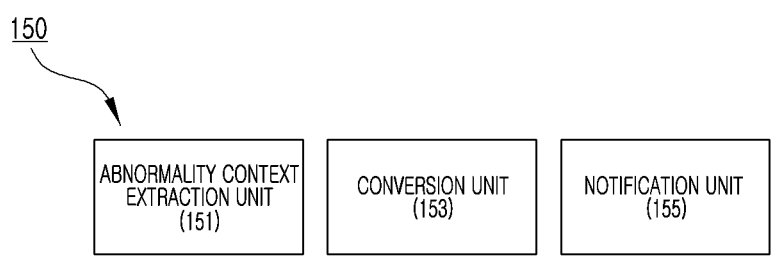
FIG. 2 is a diagram showing the data processing process of a notification module according to an embodiment.

FIG. 2 is a diagram showing the data processing process of a notification module according to an embodiment.

Referring to FIG. 2, the notification module according to the embodiment may include an abnormality context extraction unit 151, a conversion unit 153, and a notification unit 155. The abnormality context extraction unit 151 extracts matched abnormality context information based on the detailed information of an auditory abnormality signal including the type, magnitude, and source of the detected auditory abnormality signal. The conversion unit 153 converts the auditory abnormality signal into a visual output object or an auditory output object matched based on the detailed information of the detected auditory abnormality signal. For example, when a collision sound is generated around a vehicle, the generated collision sound is not output into the vehicle without change, but an abnormality context and a visual object matching the frequency and magnitude of the collision sound are extracted and displayed, and an auditory abnormality signal matching the collision sound is extracted and output. In an embodiment, the cycle of a signal to be output may be adjusted according to the magnitude and frequency of a recognized sound. Furthermore, in an embodiment, an auditory abnormality signal recognized through the previously stored auditory database is converted into a visual object or a signal sound (an auditory object).

The notification unit 155 outputs the visual output object or auditory output object obtained through the conversion.

Figure 3:
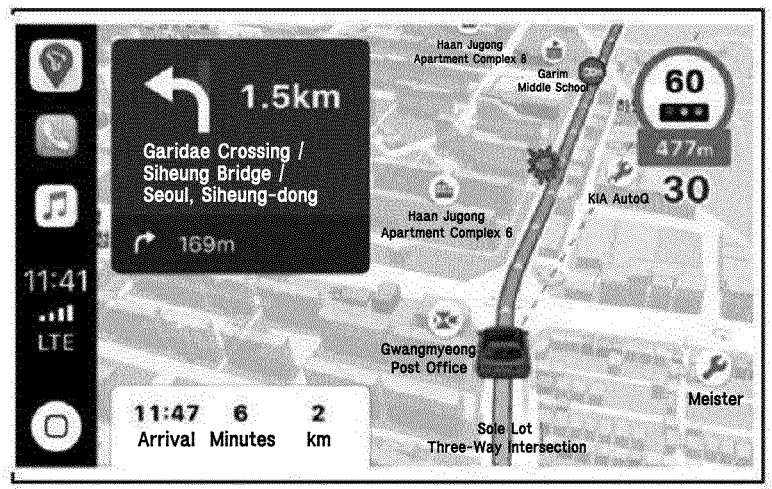
FIG. 3 is a view showing an example of the output of an abnormality signal notification system according to an embodiment.

FIG. 3 is a view showing an example of the output of an abnormality signal notification system according to an embodiment.

Referring to FIG. 3, the abnormality signal notification system according to the embodiment may display the current location of a driving vehicle and the detailed information of a recognized abnormality signal on the display panel of the vehicle. As shown in FIG. 3, in an embodiment, various visual objects corresponding to the relative location of the source of a sound to the current location of a vehicle and the magnitude and type of the generated sound may be displayed. For example, a collision sound may be output as a visual object shown in FIG. 3.

An auditory abnormality signal notification method will be sequentially described below. Since the operation (functionality) of the abnormality signal notification method according to the present invention is essentially the same as the functionality of the abnormality signal notification system, descriptions overlapping the descriptions given in conjunction with FIGS. 1 to 3 will be omitted.

Figure 4:
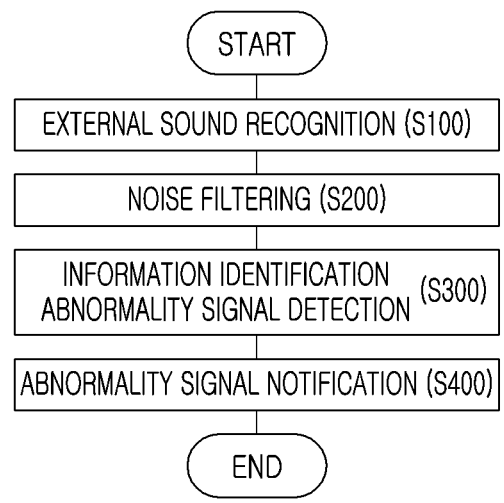
FIG. 4 is a chart showing the data processing process of an auditory abnormality signal notification system according to an embodiment.

FIG. 4 is a chart showing the data processing process of an auditory abnormality signal notification system according to an embodiment.

In step S100, the external sound recognition module recognizes a sound generated within a radius of a predetermined value or less from a point where a vehicle is located. In step S200, normal noise classified as a noise item is filtered out based on identified detailed sound information. In step S300, an auditory abnormality signal including noise of predetermined decibels or more is detected using previously set sounds, such as a collision sound, a siren sound, a motorcycle sound, etc., generated outside the vehicle by identifying detailed sound information including the source, magnitude, and type of the detected sound. In step S400, the type, magnitude, and source of the auditory abnormality signal are notified in the form of any one or more of a visual signal and an auditory signal. For example, the recognized abnormality signal may be converted into a visual object or a signal sound (an auditory object) matching an auditory abnormality signal recognized through the previously stored database, and abnormality signal information generated outside the vehicle may be transmitted to the vehicle or an occupant inside the vehicle.

Figure 5:
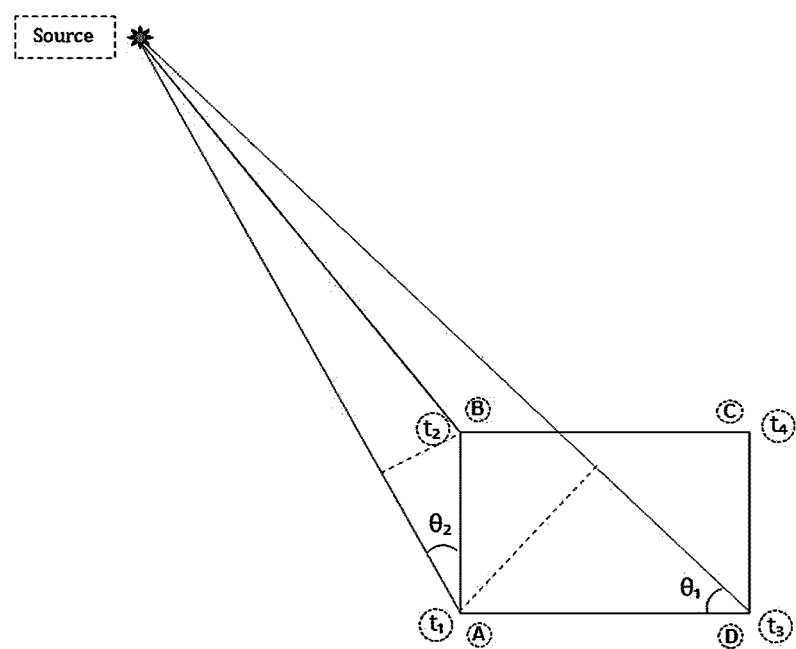
FIG. 5 is a diagram illustrating an equation for recognizing a sound source of an auditory abnormality signal notification system in a detection module according to an embodiment.

FIG. 5 is a diagram illustrating an equation for recognizing a sound source of an auditory abnormality signal notification system in a detection module according to an embodiment.

Referring to FIG. 5, A, B, C, and D denote sensors installed in a vehicle, and 'Source' denotes the source of a sound generated around the vehicle. In an embodiment, when A, B, C and D, e.g., four external acoustic sensors, are mounted, A, B, C, and D denote a front-left sensor $S_{fl}$, a front-right sensor $S_{fr}$, a back-left sensor $S_{bl}$, and a back-right sensor $S_{br}$, i.e., four external acoustic sensors, respectively.

Equation 2 is an example of an equation for calculating the distance from the source of the sound to the vehicle.

$$D_{sourceD} = \frac{AD\sin(90-\theta_2)\cos(90-\theta_2-\theta_1)}{\sin(90-\theta_2-\theta_1)} + (t_3-t_1)*C \quad \text{Equation 2}$$

In Equation 2, $D_{sourceD}$ is the distance between the Source and sensor D of FIG. 5. $\theta_1$ and $\theta_2$ are $\theta_1$ and $\theta_2$ of FIG. 5, respectively, AD is the distance between the sensors A and D, and $t_3$ and $t_1$ are the arrival time from the Source to the sensor D and the arrival time from the Source to the sensor A, respectively. In this case, C is the speed of light.

$\theta_2$ and $\theta_1$ of Equation 2 may be calculated through Equations 3 and 4.

$$\theta_2 = \cos(-1)\frac{(t_1-t_2)*C + AB*Ce}{AB} \quad \text{Equation 3}$$

$$\theta_1 = \cos(-1)\frac{(t_3-t_1)*C + AD*Ce}{AD} \quad \text{Equation 4}$$

$\theta_2$ and $\theta_1$ in Equations 3 and 4 are $\theta_2$ and $\theta_1$ of FIG. 5, respectively, and $t_1, t_2$, and $t_3$ are the arrival time from the Source to the sensor A, the arrival time from the Source to the sensor B, and the arrival time from the Source to sensor D, respectively. AB and AD are the distance between sensors A and B and the distance between sensors A and D, respectively, and C is the speed of light. Ce in Equations 3 and 4 is a correction coefficient, is generated by the simulation of the abnormality signal notification system, and is stored in the database 110. By introducing correction coefficients, the error in distance may be corrected.

The abnormality signal notification system described above filters out normal noise outside a vehicle and transmits an auditory abnormality signal to the vehicle or an occupant, so that the occupant can become aware of all abnormality signals while using the vehicle in a quiet and comfortable environment, thereby improving the safety and convenience of vehicle use of the occupant. Furthermore, the abnormality signal notification system is applied to an autonomous vehicle, so that auditory signals generated around the autonomous vehicle can be recognized also in the autonomous vehicle and can be dealt with rapidly.

In addition, the sounds of rather unpleasant auditory abnormality signals such as a plosive sound, a considerably loud sound, a scratch sound, etc. are converted into sounds in other forms, i.e., auditory objects and visual objects, and notification thereof is provided to vehicle occupants, so that auditory abnormality signals generated outside vehicles can be detected in the state in which the occupants do not directly listen to noise.

The disclosed content is merely an example, and may be variously changed and implemented by those of ordinary skill in the art without departing from the gist of the claims. Therefore, the scope of protection of the disclosed content is not limited to the specific embodiments described above.

INDUSTRIAL APPLICABILITY

The abnormality signal notification system described above filters out normal noise outside a vehicle and transmits an auditory abnormality signal to the vehicle or an occupant, so that the occupant can become aware of all abnormality signals while using the vehicle in a quiet and comfortable environment, thereby improving the safety and convenience of vehicle use of the occupant. Furthermore, the abnormality signal notification system is applied to an autonomous vehicle, thereby improving autonomous driving capabilities.

In addition, the sounds of rather unpleasant auditory abnormality signals such as a plosive sound, a considerably loud sound, a scratch sound, etc. are converted into auditory and visual objects in other forms, and notification thereof is provided to a vehicle occupant, so that auditory abnormality signals generated outside a vehicle can be identified in the state in which the occupant does not directly listen to noise.

The invention claimed is:

1. An abnormality signal notification system for notifying an abnormality signal around a vehicle, the abnormality signal notification system comprising:
   an external sound recognition module mounted on an outside of a vehicle or between an inside and outside of a vehicle, and configured to recognize a sound generated within a radius of a predetermined value or less from a point where the vehicle is located;
   a noise filtering module configured to filter out noise classified as a noise item based on identified detailed sound information;
   an abnormality signal detection module configured to, after the filtering, identify the detailed sound information including a source, magnitude, and type of the detected sound and detect an auditory abnormality signal that is an abnormality sound of predetermined decibels or more including a collision sound, a siren, a drone sound, and a loud voice; and
   a notification module configured to notify each of a type, magnitude, and generation location of the auditory abnormality signal by means of any one or more of a visual signal and an auditory signal,
   wherein the external sound recognition module comprises four acoustic sensors, which are arranged in a rectangle,
   wherein the abnormality signal detection module detects the recognized signal as the abnormality signal when a magnitude of a sum signal from four channels of the four acoustic sensors exceeds a predetermined value, and calculates a distance to a source of the abnormality signal based on Time Difference Of Arrivals (TDOAs) among detected signals from three acoustic sensors of the four acoustic sensors sharing one acoustic sensor.

2. The abnormality signal notification system of claim 1, wherein the notification module comprises;
   an abnormality context extraction unit configured to extract abnormality context information matched based on detailed information of the auditory abnormality signal including the type, magnitude, and generation location of the detected auditory abnormality signal;
   a conversion unit configured to convert the auditory abnormality signal into a visual output object or auditory output object matched according to the detailed information of the detected auditory abnormality signal; and
   an abnormality signal notification unit configured to output the visual output object or audio output object obtained through the conversion.

3. The abnormality signal notification system of claim 1, wherein the abnormality signal detection module calculates the source of the abnormality signal through detailed abnormality signal tracking information including frequency, decibel, and propagation direction information of the detected abnormality signal.

4. The abnormality signal notification system of claim 1, further comprising a database configured to store detailed sound information, context information matching the detailed sound information, and data on a sound group for learning for recognizing types of sounds, and to also store weight values and correction coefficients based on learning.

5. The abnormality signal notification system of claim 1, further comprising a driving control module configured to start autonomous driving control when an area where the abnormal signal has been generated is within a predetermined distance from the vehicle and also a level of an abnormality context matched to the abnormality signal is equal to or higher than a predetermined level.

6. An abnormality signal notification method for notifying an abnormality signal around a vehicle, the abnormality signal notification method comprising:
   (A) recognizing, by an external sound recognition module, a sound generated within a radius of a predetermined value or less from a point where the vehicle is located, wherein the external sound recognition module comprises four acoustic sensors, which are arranged in a rectangle;
   (B) filtering out, by a noise filtering module, noise classified as a noise item based on identified detailed sound information;
   (C) identifying, by an abnormality signal detection module, the detailed sound information including a source, magnitude, and type of the detected sound, and detecting, by the abnormality signal detection module, an auditory abnormality signal that is an abnormality sound of predetermined decibels or more including a collision sound, a siren, a drone sound, and a loud voice; and
   (D) notifying, by a notification module, each of a type, magnitude, and generation location of the auditory abnormality signal by means of any one or more of a visual signal and an auditory signal, wherein step (C) comprises:
   detecting the recognized signal as the abnormality signal when a magnitude of a sum signal from four channels of the four acoustic sensors exceeds a predetermined value; and
   calculating a distance to a source of the abnormality signal based on Time Difference Of Arrivals (TDOAs) among detected signals from three acoustic sensors of the four acoustic sensors sharing one acoustic sensor.

7. The abnormality signal notification method of claim 6, wherein step (D) comprises;
   extracting abnormality context information matched based on detailed information of the auditory abnormality signal including the type, magnitude, and generation location of the detected auditory abnormality signal;
   converting the auditory abnormality signal into a visual output object or auditory output object matched according to the detailed information of the detected auditory abnormality signal; and
   outputting the visual output object or audio output object obtained through the conversion.

8. The abnormality signal notification method of claim 6, wherein step (C) comprises calculating the source of the abnormality signal through detailed abnormality signal tracking information including frequency, decibel, and propagation direction information of the detected abnormality signal.

9. The abnormality signal notification method of claim 6, wherein step (A) comprises storing detailed sound information, and context information matching the detailed sound information.

10. The abnormality signal notification method of claim 6, wherein step (D) comprises starting autonomous driving control when an area where the abnormal signal has been generated is within a predetermined distance from the vehicle and also a level of an abnormality context matched to the abnormality signal is equal to or higher than a predetermined level.

\* \* \* \* \*